INVENTOR
L. V. HAGGADONE
BY R. C. Perry
ATTORNEY

INVENTOR
L.V. HAGGADONE
BY
R.C. Lerry
ATTORNEY

INVENTOR
L. V. HAGGADONE
BY
R. C. Perry
ATTORNEY

INVENTOR
L. V. HAGGADONE
BY R. C. Terry
ATTORNEY

Oct. 3, 1961 L. V. HAGGADONE 3,003,032

METHOD OF AND APPARATUS FOR CONTROLLING HIGH SPEED TAPE REPERFORATORS

Filed June 5, 1958 5 Sheets-Sheet 5

INVENTOR
L.V. HAGGADONE

BY R. C. Perry
ATTORNEY

United States Patent Office 3,003,032
Patented Oct. 3, 1961

3,003,032

METHOD OF AND APPARATUS FOR CONTROLLING HIGH SPEED TAPE REPERFORATORS

L. V. Haggadone, Indialantic, Fla., assignor to Teletype Corporation, Chicago, Ill., a corporation of Delaware Filed June 5, 1958, Ser. No. 740,092
15 Claims. (Cl. 178—92)

Figure 1:
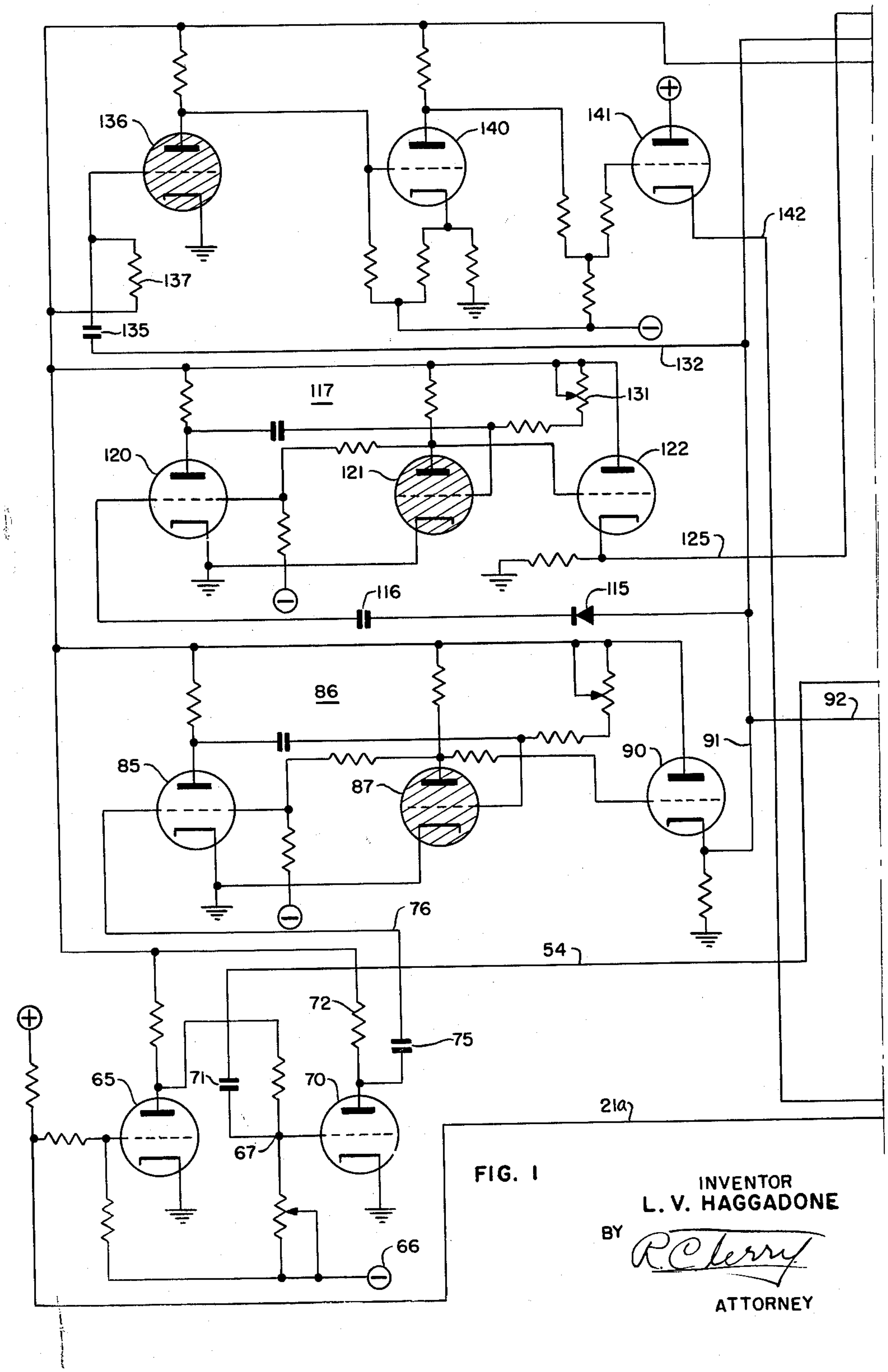
Figure 2:
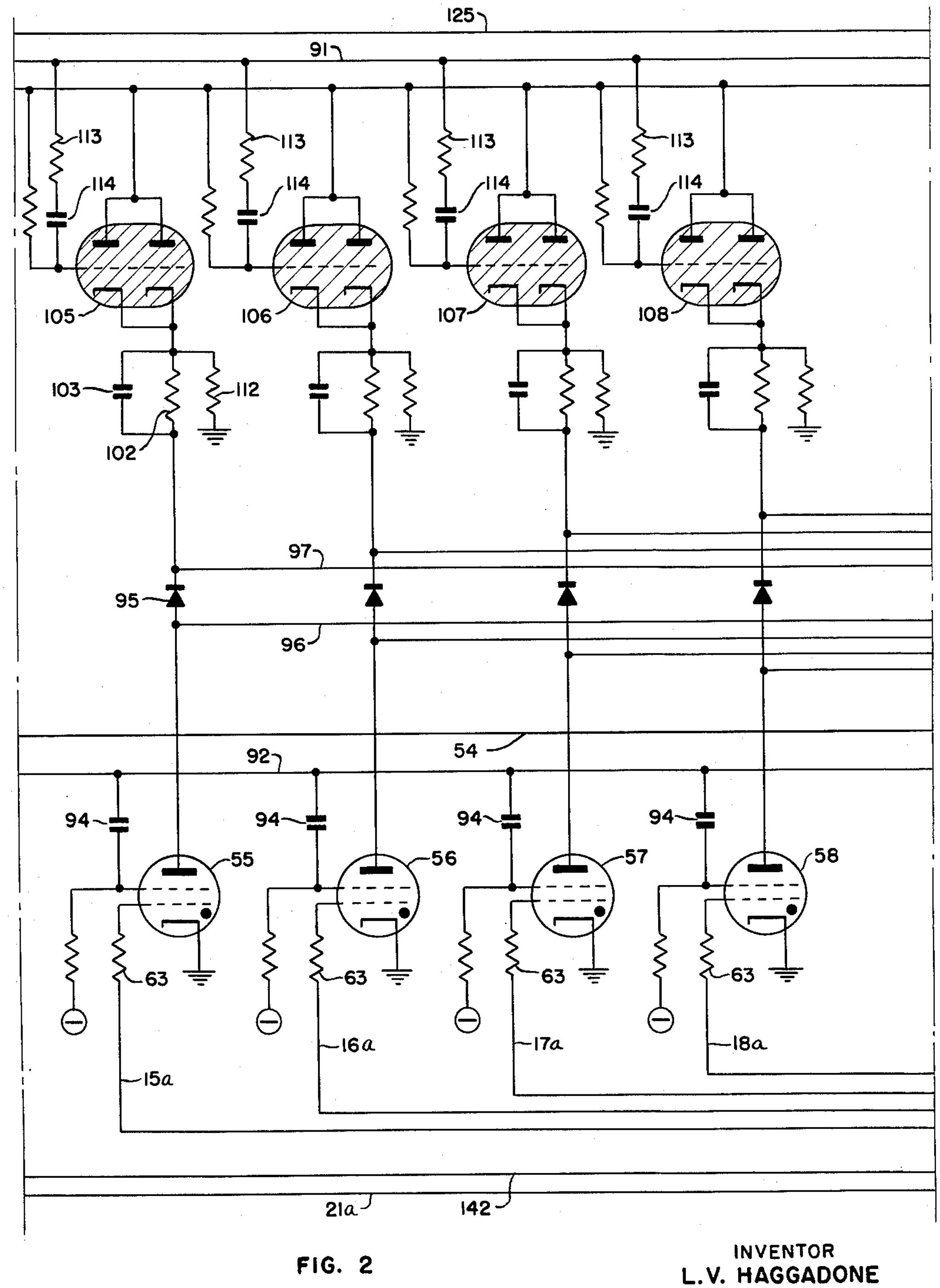
Figure 3:
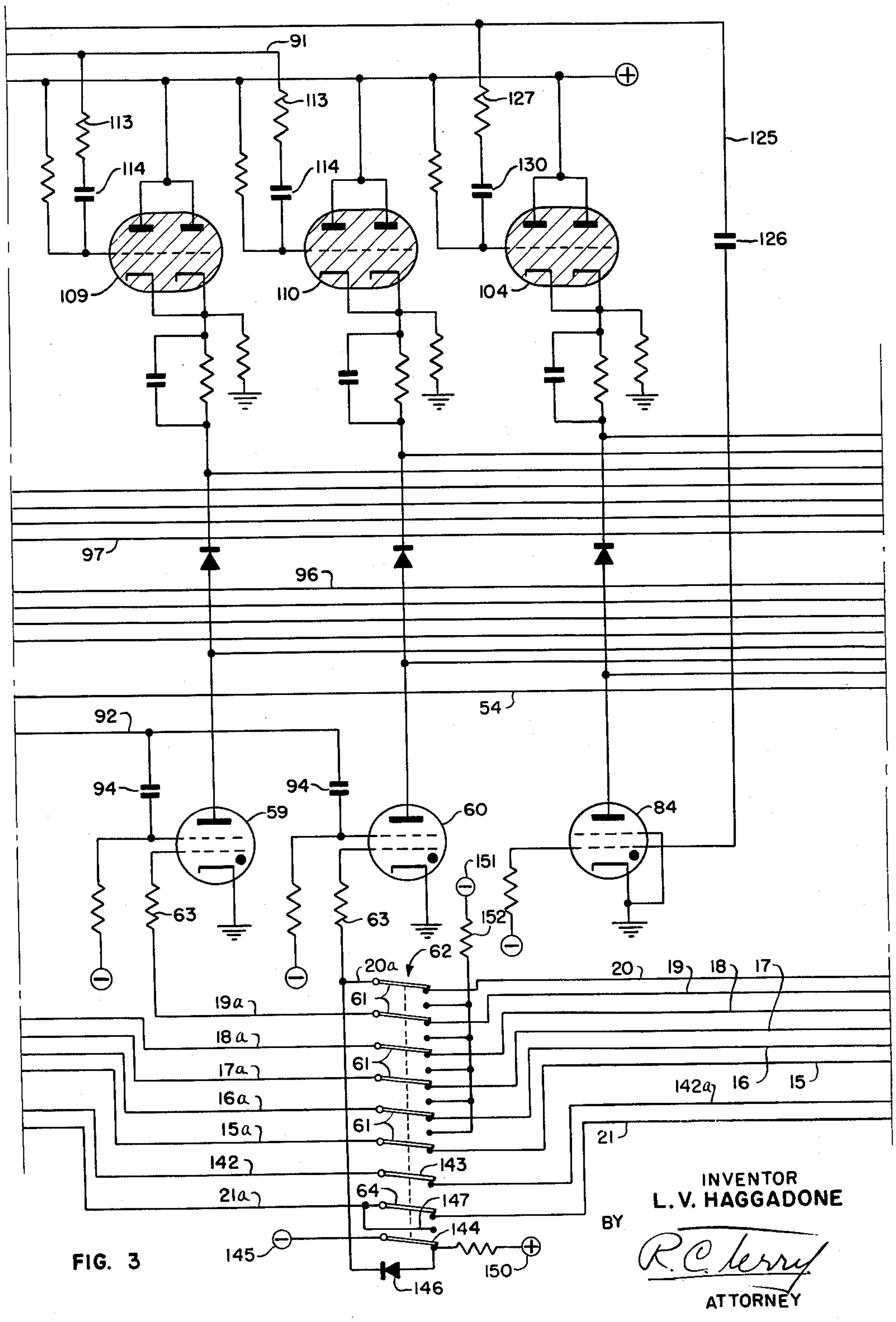

This invention relates to methods of and apparatus for controlling tape reperforators and more particularly to methods of and apparatus for controlling very high speed telegraph tape reperforators.

Printing telegraph operations have for the most part been carried on at speeds nominally designated as sixty, seventy-five and one hundred words per minute. However, in certain applications, it has become desirable to operate reperforators at speeds of between six hundred and sixteen hundred words per minute. Examples of such applications are in cross-office switching systems, where traffic must be moved speedily from a receiving position to a transmitting position; in accumulated message clearance systems, where a channel is available for short periods only and it is necessary to handle large volumes of traffic during these short periods; and in certain computer systems, where signals can be delivered rapidly by a computer and must be stored rapidly on a tape.

It is an object of the present invention to provide new and improved methods of and apparatus for controlling tape reperforators.

It is another object of the invention to provide new and improved methods of and apparatus for controlling very high speed telegraph tape reperforators.

A method of controlling tape reperforators, embodying certain features of the invention, may include selectively feeding a tape in a reperforator incident to the perforation thereof in response to intelligence signals, manually initiating feeding of the tape, and distinguishing on the tape between the feeding of the tape incident to the perforation of intelligence signals and the manually-initiated feeding thereof by repetitiously perforating the tape in a predetermined manner incident to the manually-initiated feeding of the tape.

Apparatus for controlling tape reperforators, embodying certain features of the invention, may include a plurality of punch magnets and a feed magnet associated with a tape reperforator, an energizing circuit for each of the magnets including a capacitor connected serially therewith, means for applying signals comprising marking and spacing conditions to the punch magnet energizing circuits whereby each marking condition thereof conditions one of such circuits for operation, means for operating each of the conditioned punch magnet energizing circuits and the feed magnet energizing circuit through the associated capacitor, and manually-operable means for applying a predetermined signal including at least one marking condition to the punch magnet energizing circuits and for initiating the operation of the reperforator independently of the first-mentioned signal-applying means to produce a feed-out of tape distinguishable from any feed-out normally produced under the control of the first-mentioned signal-applying means.

More specifically, a control circuit embodying the invention, and by which methods embodying the invention may be practiced, may include a plurality of storage tubes which are conditioned for conduction by the application thereto of marking conditions from a source of telegraph signals, or the like, including marking and spacing conditions. When the source has a signal ready to deliver to the storage tubes in the control circuit, a potential of a particular polarity is applied to a gating circuit in the control circuit. This potential renders the gating circuit responsive to a series of periodically-generated pulses from a high speed tape reperforator having a plurality of punches, the actuation of which is controlled by the control circuit. Each of these pulses from the reperforator causes all conditioned storage tubes to be rendered conductive simultaneously.

The cathode-anode circuit of each storage tube is connected in series with a normally-discharged capacitor and a selector magnet. A selector magnet is provided for each signal impulse in the particular code being delivered by the signal source and for advancing the tape in the reperforator. When any storage tube is rendered conductive, the associated normally-discharged capacitor in the anode circuit thereof initially passes a very high charging current which also passes through the serially-connected selector magnet. This initial charging current of the capacitor causes the rapid and positive selection of the corresponding punch in the reperforator and actuation of the tape feeding means therein. Consequently, perforations are punched in the tape corresponding to each marking condition in the signal source, and the tape is rapidly advanced.

Another feature of the invention includes a method of and means for distinguishing between tape feeding caused by a "blank" signal, that is, a signal including all spacing conditions, and tape feeding caused by manually-selectable means. To so distinguish between these two tape-feeding operations, a switch is provided which is normally ineffective when manual tape feed is not desired. Consequently, any blank signal from the signal source will cause the feeding of the reperforator tape with no perforations punched therein. When manual feeding of the tape is desired, the switch is closed to connect the proper potentials to a storage tube associated with a predetermined one of the signal conditions to condition this storage tube for conduction. Consequently, the periodically-generated pulses from the reperforator energize this storage tube and the normally-conditioned storage tube associated with the tape-feeding means. As a result, when manual tape feed is chosen, not only will the reperforator tape be advanced, but also a perforation corresponding to a predetermined signal condition will be punched in the tape, thereby distinguishing manually-initiated tape feed from automatically-initiated tape feed.

Figure 4:
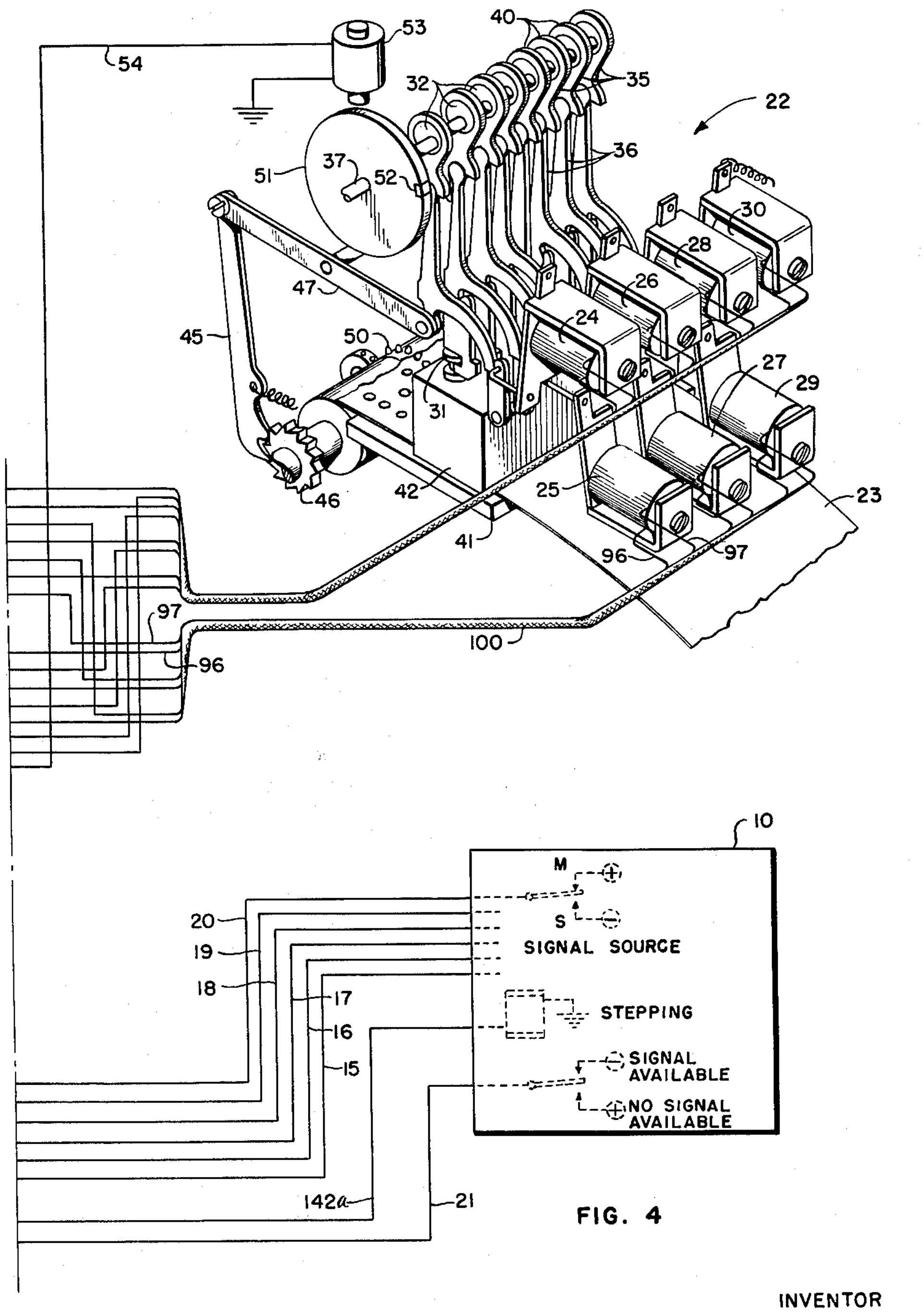
Figure 5:
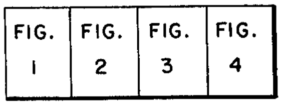
Figure 6:
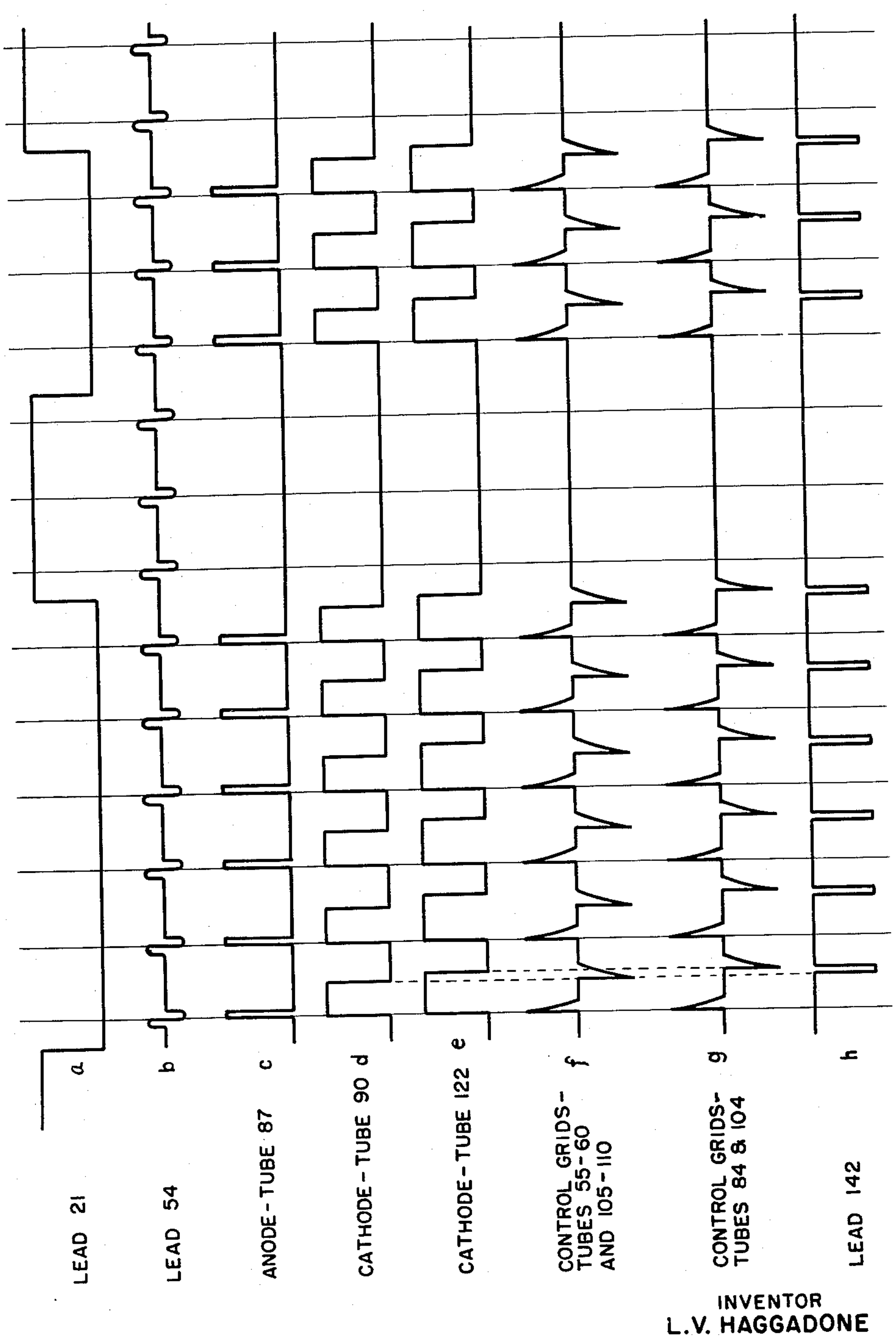

The hereinabove-recited and other objects and features of the invention will be apparent from the following detailed description of a specific embodiment thereof, when read in conjunction with the accompanying drawings, in which:

FIGS. 1 to 4, inclusive, when assembled in the manner depicted in FIG. 5, show a schematic diagram of a control circuit embodying the invention and by means of which methods embodying the invention may be practiced, and FIG. 6 shows a plurality of waveforms of voltages which appear at particular points in the circuit shown in FIGS. 1 to 4, inclusive.

Referring now to the drawings, a source of telegraph signals or the like, including marking and spacing conditions is shown at 10 in FIG. 4. The source 10 may be any series of telegraph signals such as signals being received in a telegraph receiver, signals from a tape in an accumulated message clearance system or signals from a computer. The main requirement of the source 10, with respect to the present invention, is that the code conditions of which the signal is comprised be of the type wherein a marking condition is a positive potential and a spacing condition is a zero or negative potential. Each of these code conditions is impressed on an associated one of a plurality of output leads 15 to 20, inclusive. Another requirement of the signal source, for the purposes of the present invention, is that a negative potential appear on a lead 21 when the source 10 is prepared to deliver a signal. When the source 10 has no signal to deliver, a positive potential is impressed on the lead 21. Should the signal source 10 be a tape reader, these potentials can be applied through a tape-out switch. Should the source 10 be a computer, the required potentials can be generated by any suitable means well known in the computer art.

The signals appearing on the leads 15 to 20, inclusive, are punched by a high speed tape reperforator, designated generally by the numeral 22 in FIG. 4, into a tape 23. The reperforator 22 is of the type shown in Patent No. 2,675,078, granted April 13, 1954, to W. J. Zenner, and the disclosure of that patent is incorporated herein by reference to the same extent as if it had been included herein in its entirety. For the purpose of the present invention, it is sufficient to state herein that the reperforator 22 includes a feed magnet 24 to feed the tape 23 and a plurality of selector magnets 25 to 30, inclusive, each of the latter magnets being associated with a code punch, such as that shown at 31 in FIG. 4. As described in the Zenner patent, the code punches, such as the punch 31, will reciprocate vertically by virtue of their connections to a plurality of eccentrics 32—32 and links 35—35 and 36—36.

The eccentrics 32—32 are secured to a continuously-rotating, power-driven shaft 37 and are positioned within collars 40—40, formed integrally on the links 35—35. When one of the magnets 25 to 30, inclusive, is energized, the corresponding code punch 31 will move downwardly so that the punch passes through an aperture in a die block 41. The tape 23 passes over the die block 41 and between the die block and a punch block 42. Also, when the tape feed magnet 24 is energized, a feed pawl 45 rotates a feed ratchet 46 through a lever 47, connected to one of the links 36—36 to rotate a feed wheel 50 and to advance the tape 23 so that it is in position to receive a new set of perforations. The eccentrics 32—32 are so positioned around the shaft 37 that, upon initiation of operation of the reperforator 22, the punches associated with the selector magnets 25 to 29, inclusive, first punch perforations in the tape 23. Thereafter, the tape feed mechanism, including the feed pawl 45, the feed ratchet 46 and the feed wheel 50, is actuated by the feed magnet 24.

An element associated with the reperforator 22, and not included in the Zenner patent, is a disk 51. The disk 51 is secured to the shaft 37 and rotates therewith. A major portion of the disk 51 is composed of nonmagnetic material, such as brass, and a small insert 52 of a magnetic material, such as steel, is secured to the periphery of the disk 51. Secured fixedly, by suitable means (not shown), adjacent to the periphery of the disk 51 is a pickup coil 53 which surrounds a permanent magnet core. As the shaft 37 rotates, the steel insert 52 causes an increase in magnetic fluid when it is adjacent to the core of the coil 53, and a decrease in such flux as it rotates past the core. Consequently, a positive pulse and a negative pulse will be produced by the pickup coil 53 for each revolution of the shaft 37, and these pulses will be applied to a lead 54.

Each of the leads 15 to 20, inclusive, to which are applied the signal conditions from the source 10, is connected to the control grid of an associated one of a group of storage tubes 55 to 60, inclusive and respectively. These connections are made through manually-operable contactors 61—61, which form part of a switch 62 to be described more fully hereinafter, leads 15*a* to 20*a*, inclusive and respectively, and associated resistors 63—63. The storage tubes 55 to 60, inclusive, are gas tubes of the arc-discharge or thyratron type and have the characteristic that once conduction is initiated between the cathode and anode hereof, the tube can be extinguished only by lowering the anode potential or by increasing the cathode potential. As stated hereinabove, when a signal is present in the source 10 and code conditions corresponding thereto are impressed on the leads 15 to 20, inclusive, a negative potential appears on the lead 21. Prior to this time, that is, when no signal was ready for delivery in the source 10, a positive potential was applied to the lead 21. The effect of these potentials on the operation of the storage tubes 55 to 60, inclusive, will now be described.

A positive potential on the lead 21 is impressed through a contactor 64 of the switch 62 and a lead 21*a* onto the control grid of a tube 65 (FIG. 1), maintaining this tube conductive. When the tube 65 conducts, its anode potential is at some relatively-low value, which, when combined with a negative source 66, impresses a negative potential on a junction point 67. Assume that the potential of the junction point 67 is −15 volts under these conditions. This negative potential will maintain a tube 70 nonconductive as long as it is applied to the junction point 67. Also connected to the junction point 67 is the lead 54, through a capacitor 71. The positive and negative pulses which appear periodically on the lead 54 from the pickup coil 53 are applied through the capacitor 71 to the junction point 67. Assume that these pulses have amplitudes of +8 volts and −8 volts, respectively. As long as the tube 65 is held conductive by the positive potential on the lead 21 so that the junction point 67 is held at −15 volts, the positive pulses of +8 volt amplitude from the pickup coil 53 will not be sufficient to render the tube 70 conductive, and the negative pulses of −8 volt amplitude will only further hold the tube 70 nonconductive.

As soon as the source 10 is prepared to deliver a signal, a negative potential appears on the leads 21 and 21*a*. This negative potential renders the tube 65 nonconductive, its anode potential increases and the potential of the junction point 67 is also increased. Assume that the potential now present on the anode of the tube 65, when combined with the negative source 66, impresses a slightly-positive potential of several volts on the junction point 67. This small, positive potential will render the tube 70 conductive so that its anode potential drops. Then, when a negative pulse of −8 volt amplitude appears on the lead 54 from the pickup coil 53, the amplitude of this negative pulse is sufficient to render the tube 70 again nonconductive, and the anode potential will increase for the duration of the pulse. Consequently, a positive pulse appears at the anode of the tube 70 each time the magnetic insert 52 passes the core within the pickup coil 53, that is, for each revolution of the shaft 37. This positive pulse is differentiated by a resistor 72 and a capacitor 75 to provide a short, positive pulse which is applied to a lead 76.

As stated hereinabove, marking condition, appearing on the leads 15 to 20, inclusive, conditions the six storage tubes 55 to 60, inclusive and respectively, for conduction. Assume that such marking condition appears on the leads 15, 17 and 19, and that spacing condition appears on the leads 16, 18 and 20. The marking condition will condition the storage tubes 55, 57 and 59 for conduction, while the tubes 56, 58 and 60 will remain unconditioned. A seventh storage tube 84 has its screen grid connected to its cathode so that this latter tube is normally conditioned for conduction, and such conduction will occur when a positive potential is applied to its control grid. To provide such a positive potential, when the tube 70 is rendered nonconductive, as described hereinabove, the short, positive pulse appearing on the lead 76 is applied to the grid of a tube 85, associated with a first timer 86. The timer 86 includes the tube 85 and another tube 87, and these tubes are connected as a univibrator or a one-shot multivibrator. The tube 87 is normally conductive, and the rendering conductive of the tube 85 will cut off the tube 87 for a predetermined time depending upon the circuit constants. This action occurs each time a short, positive pulse appears on the lead 76.

As soon as the tube 87 is rendered nonconductive, its anode potential increases, and this increased potential is applied to the grid of a cathode follower 90 and appears on the cathode thereof. This positive potential is then applied over leads 91 and 92 and through a plurality of capacitors 94—94 to the screen grids of the storage tubes 55 to 60, inclusive. Any of the storage tubes which are conditioned for conduction will fire when the positive pulse, appearing on the leads 91 and 92, is impressed on its screen grid. Serially connected in the anode circuit of the storage tube 84 is the feed magnet 24, and serially connected in the anode circuits of each of the storage tubes 55 to 60, inclusive, is a corresponding one of the punch selector magnets 25 to 30, inclusive and respectively. For example, refer to the storage tube 55 which, as described previously, had been conditioned for conduction by marking condition on the lead 15. Its anode is connected to a diode 95, across which are connected two leads 96 and 97. The leads 96 and 97 are connected through a cable 100 to the punch selector magnet 25 which causes a perforation in the tape 23 corresponding to the No. 1 code element (marking condition in the lead 15) of the telegraph signal being provided by the source 10. The upper side of the diode 95, to which the lead 97 is connected, is connected through a circuit, including a resistor 102 and a shunting capacitor 103, to the cathode of a release amplifier 105 which is one of a group of such amplifiers designated by the numerals 104 to 110, inclusive.

The release amplifier 105 is connected as a cathode follower and has a resistor 112 of high value (of the order of 1 megohm) connected between its cathode and ground. The potentials applied to the electrodes of the release amplifier 105 are such that this tube is held normally conductive and supplies anode potential to the storage tube 55 through the selector magnet 25. Prior to the rendering conductive of the storage tube 55, there is no complete circuit for the selector magnet 25 so that this selector magnet is de-energized. At this time, the capacitor 103 is completely discharged through the resistor 102. When the positive pulse from the cathode of the cathode follower 90 is applied over the leads 91 and 92 and capacitor 94 to the screen grid of storage tube 55, thereby rendering the storage tube 55 conductive, the energizing circuit for the selector magnet 25 is completed.

At the instant the storage tube 55 fires, a relatively large charging current for the capacitor 103 flows through the storage tube 55 and the selector magnet 25. This current decreases exponentially until a current flow, determined by the resistor 102, the resistance of the punch selector magnet 25 and the voltage appearing on the cathode of the release amplifier 105, is reached. The large, initial flow of current through the punch selector magnet 25 accelerates the selection of the punch 31 associated therewith by very rapidly energizing the selector magnet 25. As a result, when the eccentric 32 associated with the No. 1 punch 31 is in its operating position, the No. 1 code perforation, representative of the marking condition on the lead 15, will be punched in the tape in the reperforator 22. With this structure, it will be assured that the feed magnet 24 and the punch selector magnets 25 to 30, inclusive, will be timely selected and will be prepared for the downward movement resulting from the eccentrics 32—32.

As described hereinabove, when the first timer or univibrator 86 is operated, the tube 87 is rendered nonconductive, and, after a predetermined time, it reverts to its initial, conductive state. During the time this tube is nonconductive, a positive potential appears on its anode, on the grid and cathode of the cathode follower 90 and on the lead 91. This positive potential renders any conditioned ones of the storage tubes 55 to 60, inclusive, conductive. When the tube 87 reverts to its original, conductive condition, a negative potential appears on the anode thereof, and a corresponding negative potential is likewise applied to the lead 91. This negative potential is impressed on the screen grids of the storage tubes 55 to 60, inclusive, but, since these tubes are gas tubes of the arc-discharge type, the lowering of the screen potentials thereof will not render them nonconductive. However, the negative potential now appearing on the lead 91 is also applied thereover and through resistors 113—113 and capacitors 114—114 to the control grids of the vacuum-type release amplifier tubes 105 to 110, inclusive.

The positive potential on the lead 91 when the tube 87 was nonconductive had no effect on the normally-conductive release amplifiers 105 to 110, inclusive. The negative potential, however, appearing on this lead, caused by the reversion of the tube 87 to its initial condition, renders these tubes nonconductive. When the release amplifiers 105 to 110, inclusive, cease to conduct, their cathode potentials decrease, and the anode potentials of the storage tubes 55 to 60, inclusive and respectively, are also lowered, thereby extinguishing these latter tubes. This action causes de-energization of any energized ones of the selector magnets 25 to 30, inclusive associated with the code impulses of the signal. With respect to the energizing circuit associated with the selector magnet 25, as the cathode potential of the release amplifier 105 decreases, the diode 95 will conduct to shunt the selector magnet 25. With the magnet 25 removed, effectively, from the circuit, there will be no difficulty in extinguishing the storage tube 55. Similar arrangements are provided for all of the storage tubes 55 to 60, inclusive, and for the storage tube 84.

As stated hereinabove, the storage tubes 55 to 60, inclusive, are conditioned for conduction by the signal conditions from the source 10, and the storage tube 84, associated with the tape feed magnet 24, is always conditioned for conduction since its screen grid is connected to its grounded cathode. When the timer 86 is operated, so that a positive pulse appears on the cathode of the cathode follower 90, this positive pulse not only renders any conditioned one of the storage tubes 55 to 60, inclusive, conductive, but it is also applied through a diode 115 and a capacitor 116 to operate a second timer 117. The second timer 117 includes a normally-nonconductive tube 120 and a normally-conductive tube 121, connected as a univibrator or one-shot multivibrator. The positive pulse from the cathode of the cathode follower 90 renders the tube 120 conductive and the tube 121 nonconductive. This unstable condition will remain for a predetermined time dependent upon the circuit constants. Such circuit constants are chosen so that the time required for the tube 121 to revert to its original condition for conduction, as shown in FIG. 1, is longer than the time that tube 87 in the timer 86 is held nonconductive.

When the tube 121 is nonconductive, its anode potential increases, and an increased potential appears on the cathode of a cathode follower 122. Thus, an increased potential is impressed over a lead 125, through a capacitor 126 and to the control grid of the storage tube 84, thereby rendering this tube conductive and energizing the tape feed magnet 24. It will be noted that the storage tube 84 is rendered conductive at substantially the same time as the storage tubes 55 to 60, inclusive, associated with the signal pulses, since the tubes 87 and 121 in the timers 86 and 117 are rendered nonconductive simultaneously. The feeding of the tape 23 in the reperforator 22, at a time after the perforations have been punched therein (since the tube 121 is maintained nonconductive longer than the tube 87), is determined by the angular setting of the magnetic insert 52 on the disk 51 with respect to the angular settings of the eccentrics 32—32. The insert 52 must be so positioned that, when it causes the pickup coil 53 to generate an initiating pulse, the punches will be actuated by the eccentrics 32—32 associated therewith before the tape feeding pawl 45 is actuated.

As stated hereinabove, the univibrator in the second timer 117 remains in its unstable condition for a longer time than the univibrator in the first timer 86. Consequently, the tube 121 reverts to its original, conductive condition after the tube 87 reverts to such a condition. Therefore, the potential on the cathode of the cathode follower 122 becomes negative at a time subsequent to the appearance of a negative potential on the cathode of the cathode follower 90. The negative potential on the cathode of the cathode follower 122 is applied over the lead 125, through a resistor 127 and a capacitor 130 and to the control grid of the release amplifier 104. The release amplifier 104 is rendered nonconductive by this negative potential to extinguish the storage tube 84 in the same manner as described hereinabove with reference to the storage tube 55, and to de-energize the tape feed magnet 24 associated therewith.

It can be seen that the operation of the second timer 117 is similar to that of the first timer 86, except that the second timer 117 renders its associated storage tube 84 nonconductive after the storage tubes 55 to 60, inclusive, are rendered nonconductive by the first timer 86. This results in the tape feed magnet 24 being de-energized after the selector magnets 25 to 30, inclusive, are de-energized. This is necessary since the tape feeding means, selected by the tape feed magnet 24, is actuated after the punches 31—31, selected by the punch selector magnets 25 to 30, inclusive, are actuated. Since the feeding of the tape 23 must obviously occur after the punching thereof by the punches 31—31, the eccentric 32 associated with the feed pawl 45, is displaced angularly by 45° on the shaft 37 with respect to the angular positionment of the eccentrics 32—32, associated with the punches 31—31. Consequently, the punch selector magnets may be released before the tape feed magnet may be released. As described hereinabove, this successive releasing is accomplished by having the first timer 86 release the punch selector magnets 25 to 30, inclusive, at a first predetermined time, and the second timer 117 release the feed magnet 24 at a second predetermined time thereafter. This timing is adjustable by varying the position of the tap on a variable resistor 131 in circuit of the second timer 117.

It can be seen from the above description, that, as soon as the signal source 10 is prepared to deliver a signal, the negative potential applied to the lead 21 and through the contactor 64 immediately cuts off the tube 65 and renders the tube 70 conductive. Subsequently, cut-off of the tube 70 is caused momentarily by the negative portion of the first timing pulse from the pickup coil 53. Receipt of this first negative pulse renders the tube 70 nonconductive, operates the first timer 86 and the second timer 117 and causes the punching and the feeding of the tape 23 in the reperforator 22 almost instantaneously. Consequently, since the signal source 10 has delivered its signal, a succeeding signal can be readied for delivery almost immediately after the preceding signal has been delivered. To synchronize the operation of the control circuit embodying the invention and the signal source 10, a pulse is developed in the control circuit for energizing suitable instrumentalities (not shown) in the signal source to prepare a succeeding signal for delivery therefrom.

This synchronizing pulse is developed by the negative potential appearing on the cathode of the cathode follower 90 after the univibrator in the first timer 86 reverts to its original condition, as shown in FIG. 1. This negative pulse is applied over the lead 91, to a lead 132, through a capacitor 135 and to the grid of a normally-saturated tube 136. The negative transition appearing on the cathode of the cathode follower 90 cuts off the tube 136 for a length of time determined by the values of the capacitor 135 and a resistor 137. When the tube 136 is rendered nonconductive, its anode potential rises, and this increased potential is sufficient to drive a normally-nonconducting tube 140 to saturation. The driving of the tubes 136 and 140 between cutoff and saturation squares the pulse appearing on the cathode of the cathode follower 90 and the leads 91 and 132, and provides a perfectly-square pulse at the anode of the tube 140. Since this pulse was formed by the tube 140 being rendered conductive, it appears as a short, negative pulse on the cathode of a cathode follower 141. This negative pulse is then applied over a lead 142, through a contactor 143 of the switch 62 and over a lead 142*a* to the signal source 10 and causes therein an advancing of the signal source to present a new code combination to the leads 15 to 20, inclusive. Should the signal source 10 be a tape-reading device, the negative pulse appearing on the leads 142 and 142*a* will be applied to a tape-feeding magnet associated therewith, as shown diagrammatically in FIG. 4, to advance the tape and present a new code combination to sensing pins thereof.

The operation of the control circuit embodying the present invention will be seen more clearly by referring to the waveforms shown in FIG. 6. In FIG. 6*a*, the potential conditions shown are those which are applied to the lead 21. When no signal is to be delivered by the signal source 10 to the reperforator 22, a positive potential appears on the lead 21, and this positive potential maintains the tube 65 conductive and the tube 70 nonconductive. At this time, the positive portions of the continuously-applied positive and negative pulses from the pickup coil 53 and on the lead 54 (FIG. 6*b*) are not of sufficient amplitude to render the tube 70 conductive. When, however, the source 10 has a signal to deliver, a negative potential condition (FIG. 6*a*) is applied to the lead 21, thereby rendering the tube 65 nonconductive and maintaining the tube 70 conductive with several volts on its control grid. Then, the negative portions of the pulses from the pickup coil 53 and on the lead 54 are sufficient in amplitude to render the tube 70 nonconductive. Consequently, positive pulses, corresponding to the negative pulses from the pickup 53, appear on the anode of the tube 70, and such positive pulses are shown in FIG. 6*c*.

These positive pulses trigger the first timer 86, which, in turn, operates the second timer 117. The output of the first timer 86, appearing on the cathode of the cathode follower 90, is shown in FIG. 6*d*, and the output of the second timer 117, appearing on the cathode of the cathode follower 122, is shown in FIG. 6*e*. The potential on the cathode of the cathode follower 90 is differentiated by the capacitors 94—94 and the associated resistors and is applied to the screen grids of the storage tubes 55 to 60, inclusive, which are associated with the punch magnets 25 to 30, inclusive and respectively. Also, the potential on the cathode of the cathode follower 90 is differentiated by the capacitor 126 and associated resistor and is applied to the control grid of the storage tube 84, associated with the feed magnet 24. It can be seen that negative-to-positive transitions of these differentiated pulses (see FIGS. 6*f* and 6*g*) occur simultaneously so that the punch selector magnets 25 to 30, inclusive, are energized by the first timer 86 at the same time that the feed magnet 24 is energized by the second timer 117. After a predetermined time, a negative transition appears at the output of the first timer 86, and this negative transition is differentiated by the capacitors 114—114 and the associated resistors to provide a short, negative potential which is applied to the grid of each of the release amplifiers 105 to 110, inclusive. Each of these negative pulses is shown in FIG. 6*f* and renders the release amplifiers 105 to 110, inclusive, nonconductive to de-energize the punch selector magnets 25 to 30, inclusive and respectively.

A short time thereafter, when the negative going transition of the second timer 117 appears on the cathode of the cathode follower 122 (FIG. 6*e*), this pulse is differentiated to form a negative pulse which renders the release amplifier 104 nonconductive to de-energize the tape feed magnet 24. Each of these negative pulses is shown in FIG. 6g, and it will be noted that the tape feed magnet 24 is de-energized thereby a short time after the punch selector magnets 25 to 30, inclusive, are de-energized. As described hereinabove, this time lag compensates for the angular displacement of the eccentric 32 associated with the feed pawl 45 in the tape-feeding means and the eccentrics 32—32 associated with the punches 31—31. Also, the negative pulses which appear on the leads 142 and 142a and which advance the signal source 10 are shown in FIG. 6h.

It can be seen, from the above description, that for every "blank" signal (a signal including all spacing conditions) applied to the leads 15 to 20, inclusive, the tape 23 in the reperforator 22 will be advanced, and no code perforations will be punched therein. This will result since the "blank" signal has associated therewith a negative potential which is applied to the lead 21, indicating that the source 22 has a signal to deliver. Since a negative potential is applied to the lead 21, the timers 86 and 117 will be operated, and an operating potential will be applied to the screen grids of the storage tubes 55 to 60, inclusive. However, since a spacing or a no-current condition is being applied to the leads 15 to 20, inclusive, none of the storage tubes 55 to 60, inclusive, will be conditioned for conduction. Consequently, none of these tubes is rendered conductive, but, since the storage tube 84 is normally conditioned for conduction, it is fired by the second timer 117. Therefore, the tape 23 in the reperforator 22 will be advanced, but not perforations will be punched therein, indicating that the advancing of the reperforator tape was caused by a signal from the source 10 of all spacing conditions.

In some instances, it is necessary to provide manually-initiated feeding of the tape 23 in the reperforator 22. In this situation, it is desirable to distinguish, on the reperforator tape 23, between the advancement of the tape by the manually-initiated feeding means and the advancement caused by all spacing conditions being provided by the signal source 10. To accomplish this, a contactor 144 of the manual switch 62 is provided. The contactor 144 is normally in the lower position shown in FIG. 3 and is ineffective in this position since a negative source 145 is applied therethrough and is impressed on a diode 146, rendering the diode nonconductive. The other side of the diode 146 is connected to the control grid of the storage tube 60, through the associated resistor 63. When, however, the contacts 61—61, 64, 143 and 144 of the switch 62 are moved manually to their second, upper positions, the negative source 145 is disconnected from the diode 146 and is applied over a lead 147 to the lead 21a. The negative source 145, therefore, replaces the negative potential which had been applied to the leads 21 and 21a by the signal source 10 since this latter potential is ineffective when the contactor 64 is in its upper position. Consequently, with the contactor 144 in its upper position, the timers 86 and 117 will be operated each time a negative pulse is received from the pick-up coil 53.

Also, with the contactor 144 connected to its upper position, a positive source 150 renders the diode 146 conductive and conditions the storage tube 60 for conduction. Further, the contactors 61—61 in the leads 15 to 19, inclusive, connect a negative source 151 through a resistor 152 to the control grids of the storage tubes 55 to 59, inclusive, so that these tubes will not be conditioned for conduction. Therefore, since the storage tube 60, associated with the selector magnet 30, and the storage tube 84, associated with the tape feed magnet 24, are the only storage tubes conditioned for conduction when the contactors associated with the switch 62 are in their upper positions, these two tubes only will be rendered conductive during each cycle of operation of the reperforator 22. Consequently, when the tape 23 in the reperforator 22 is fed out by manually positioning the ganged contactors of the switch 62 in the upper positions, a single perforation will be punched in the tape 23 for each step the tape is advanced. Since no perforations were punched in the tape 23 when the tape was fed out by a source of blank signals, this structure distinguishes between the manually-initiated and automatically-initiated types of tape feeding.

It is to be understood that the above-described embodiments of the invention are merely illustrative of the principles thereof and that numerous modifications and embodiments of the invention may be devised within the spirit and scope thereof.

What is claimed is:

1. A method of controlling tape reperforators of the type having a plurality of punches for perforating a tape, a punch magnet for selecting an associated one of the punches and a feed magnet for advancing the tape, which comprises conditioning each punch magnet for operation in response to a marking condition of the received telegraph signal comprised of permutations of marking and spacing conditions, normally conditioning the feed magnet for operation, periodically operating all conditioned punch magnets and the conditioned feed magnet subsequently to the conditioning thereof, manually initiating repetitious operation of said feed magnet, and operating a predetermined one of said punch magnets incident to each of said repetitious operations of said feed magnet to distinguish by a single perforation on the tape between the manually-initiated advancement of the tape and advancement thereof caused by a signal of all spacing conditions.

2. Apparatus for controlling tape reperforators, which comprises a plurality of punch magnets and a feed magnet associated with a tape reperforator, an energizing circuit for each of the magnets including a capacitor connected serially therewith, means for applying signals comprising marking and spacing conditions to the punch magnet energizing circuits whereby each marking condition thereof conditions one of such circuits for operation, means for operating each of the conditioned punch magnet energizing circuits and the feed magnet energizing circuit through the associated capacitor, and manually-operable means for applying a predetermined signal including at least one marking condition to the punch magnet energizing circuits and for initiating the operation of the reperforator independently of the first-mentioned signal-applying means to produce a feed-out of tape distinguishable from any feed-out normally produced under the control of the first-mentioned signal-applying means.

3. Apparatus for controlling tape reperforators having therein a plurality of punches for perforating a tape in accordance with telegragh signals from a signal source, a punch magnet for actuating an associated one of the punches and a feed magnet for advancing the tape, which comprises a normally-open energizing circuit for each of the magnets including a normally-discharged capacitor connected in series with the magnet, means operated by each marking condition in a telegragh signal for closing an energizing circuit associated with one of the punch magnets, means operated by each signal for closing the energizing circuit associated with the tape feed magnet, the closing of the energizing circuits charging the capacitors therein and energizing the magnets associated therewith, means for selectively disconnecting the signal source from the energizing circuits and for closing the energizing circuits of one of the punch magnets and the feed magnet, the last-mentioned means for distinguishing in the tape between the advancement of the tape under control of the last-mentioned means and the advancement thereof under the control of any signal normally supplied in numerous sequence by said source.

4. Apparatus for controlling tape reperforators having a plurality of punches for perforating a tape in accordance with telegraph signals, a punch magnet for actuating each of the punches and a magnet for advancing the tape, which comprises a plurality of storage tubes, an energizing circuit for each of the punch magnets connected serially with one of the storage tubes and including a normally-discharged capacitor, means for normally conditioning the storage tube associated with the tape advancing magnet for conduction, means for selectively conditioning the storage tubes associated with the punch magnets for conduction according to marking conditions of telegraph signals or for withholding telegraph signals and conditioning only a predetermined one such storage tube for conduction, and means for applying an operating potential to the conditioned storage tubes and thereby completing an energizing circuit for the associated magnets in which the associated capacitor initially passes a large charging current.

5. A control circuit for connecting a source of signals including marking and spacing conditions to a plurality of magnets associated with a reperforator, wherein energization of one of the magnets causes advancement of a tape in the reperforator and energization of any of the remaining magnets causes a perforation to be punched in the tape, the control circuit comprising a plurality of thyratrons each of which has an anode, a cathode and two control electrodes, a plurality of capacitors, means for connecting one of the magnets and one of the capacitors in series with the anode circuit of each of the thyratrons, means for normally discharging the capacitors, means for applying each signal condition to a first control electrode of one of the thyratrons whereby a marking condition will condition the thyratron for conduction, means for continuously applying a conditioning potential to a first control electrode of the thyratron associated with the tape-advancing magnet to condition such thyratron normally for conduction, means for applying an operating potential to the second control electrodes of the thyratrons to render each conditioned thyratron conductive and to complete a current path for the magnet in the anode circuit thereof through the associated capacitor which is charged by a large, initial current upon the thyratron being rendered conductive, and manually-operable means for selectively rendering the signal source ineffective and for applying a conditioning potential to the first electrodes of one of the thyratrons associated with a punch magnet and the thyratron associated with the tape-advancing magnet, the last-mentioned means energizing the operating-pulse-applying means to place a single perforation in the tape to distinguish between manually-initiated feed-out of the tape by the tape-advancing magnet and the advancement caused by the signal source.

6. Apparatus for controlling the operation of tape reperforators of the type having a plurality of punches for perforating a tape in accordance with a telegraph signal including marking and spacing conditions, a punch magnet for actuating each of the punches and a magnet for advancing the tape through the reperforator, which comprises a plurality of storage tubes of the arc-discharge type having an anode, a cathode and two control electrodes, a serially-connected, anode-potential-supplying circuit for each of the storage tubes including a normally-conducting cathode follower, a capacitor and one of the reperforator magnets, a resistor connected across each of the capacitors for normally discharging the associated capacitor, means for applying individual conditions of each telegraph signal to a first control electrode of each of the storage tubes associated with the punch magnets whereby a marking condition thereof conditions the storage tube for conduction, means for continuously conditioning the storage tube associated with the tape-advancing magnet for conduction, a source for generating operating pulses periodically, a gating circuit for rendering the operating pulses ineffective in the absence of a signal from the signal source and for applying an operating pulse to the second control electrodes of the storage tubes subsequently to the application of the signal conditions to the first control electrodes to render the conditioned storage tubes conductive, the rendering conductive of each storage causing a large, initial flow of current to pass through the capacitor and the magnet associated therewith to energize such magnet, selectively and manually-operable means for rendering ineffective the signal source, for conditioning a predetermined one of the storage tubes associated with a punch magnet and for rendering the gating circuit effective to apply an operating pulse to the second control electrodes of the storage tubes, the last-mentioned means for distinguishing between the manually-selected advancement of the tape and the advancement caused by a signal of all spacing conditions, and means energized by the operating pulse for rendering the cathode followers nonconductive and for thereby extinguishing the storage tubes.

7. A control circuit for reperforators having therein a plurality of punches for perforating a tape, a punch magnet for actuating an associated one of the punches and a feed magnet for advancing the tape, which comprises means for applying telegraph signals to the magnets to actuate each magnet associated with a marking condition in the signal and to advance the tape, and manually-operable means for selectively disconnecting the signal-applying means from the punch magnets and for actuating a predetermined one of such magnets and the feed magnet, the last-mentioned means for distinguishing in the tape between manually-initiated repetitious advancement of the tape and repetitious advancement thereof caused by a signal normally subject to being applied repeatedly by the signal-applying means.

8. A control circuit for reperforators having therein a plurality of punch magnets and a magnet for advancing tape, which comprises a source of signal elements comprising either of two conditions, each of the punch magnets associated with a corresponding one of the signal elements for registering either of the conditions in the tape, means for energizing each punch magnet upon application thereto of one of the two conditions from the signal source, means for energizing the tape advancing magnet upon application of each signal to the punch magnets, and manual switching means for rendering the signal source ineffective and for energizing a predetermined one of the punch magnets and the tape-advancing magnet to distinguish between manually-initiated advancement of the tape and the advancement thereof caused by signal source in which all elements are of one of the conditions.

9. A control circuit for reperforators having therein a plurality of punches for perforating a tape, a punch magnet individual to and for actuating each of the punches and a feed magnet for advancing the tape, which comprises a storage tube for energizing each of the magnets, means for selectively conditioning for conduction any of the storage tubes associated with the punch magnets by applying a marking condition thereto from a source of signals including marking and spacing conditions, means for normally conditioning for conduction the storage tube associated with the feed magnet, means for periodically rendering conductive all conditioned storage tubes to energize the associated punch magnets to perforate indicia in the tape corresponding to the signal source and to advance the tape a predetermined distance subsequently to such perforating operation, a second conditioning means, and switching means for rendering ineffective the signal source and for selectively rendering the second conditioning means effective upon a predetermined one of the storage tubes to produce repetitious punching of the tape in correspondence with the predetermined one storage tube.

10. A control circuit for a reperforator, which comprises a source of signals comprised of elements having marking and spacing conditions, a plurality of storage tubes each having a control grid and a screen grid, a plurality of conductors for applying the signal condition of each of the signal elements to the control grid of a corresponding one of the storage tubes whereby a marking condition thereon conditions the associated storage tube for conduction, a plurality of magnets in the reperforator, one of the magnets associated with an advancing means for a tape in the reperforator and the remainder associated with punches therein for punching in the tape code indicia representative of the signal conditions, each of the magnets connected in series with the anode-cathode circuit of a corresponding one of the storage tubes and energized upon the conduction thereof, the magnet associated with the tape-advancing means being connected in series with a storage tube which is normally conditioned for conduction, means for applying an operating potential to the screen grids of the storage tubes associated with the code elements and to the control grid of the storage tube associated with the tape-advancing means for rendering conditioned ones of the tubes conductive, a second conditioning means, and manual switching means for rendering the signal source ineffective and for qualifying the second conditioning means to condition the control grids of the storage tube associated with one code element to render such tube conductive and thereby to distinguish between advancement of the tape initiated by the manual switching means and advancement caused by the signal source.

11. Apparatus for controlling the operation of tape reperforators, which comprises a plurality of punch magnets associated with a reperforator, an energizing circuit for each of the punch magnets including a normally-discharged capacitor connected in series with the punch magnet, and means for completing a current path through the capacitor and the punch magnet to charge the capacitor and to energize the punch magnet.

12. Apparatus for controlling the operation of a tape reperforator wherein each of a plurality of punches is actuated by an associated punch magnet in response to a telegraph signal to perforate a tape in the reperforator, which comprises a storage tube associated with each punch magnet, means for applying the signal to the storage tube for conditioning the tube for conduction, a capacitor connected in series with the punch magnet and the storage tube, means for normally maintaining the capacitor discharged, and means for rendering the conditioned storage tube conductive whereby the capacitor is charged and the punch magnet energized.

13. Apparatus for controlling the operation of a tape reperforator wherein punches are actuated by associated punch magnets to perforate a tape in accordance with telegraph signal elements of marking or spacing condition which comprises a plurality of storage tubes, means for applying the condition of each of the signal elements to a corresponding one of the storage tubes whereby a marking condition thereof qualifies such tube for conduction, means for applying anode potential to each of the storage tubes through a series circuit including a source of potential, a normally-discharged capacitor, the associated punch magnet and the anode of the storage tube, means for periodically generating an operating potential, means for applying the operating potential to the storage tubes whereby each conditioned tube is rendered conductive to complete a current path through the serially-connected capacitor and punch magnet whereby the large, initial current flowing through the normally-discharged capacitor causes the rapid energization of the punch magnet, and means for decreasing the anode potentials of the storage tubes to render such tubes nonconductive prior to the generation of a succeeding operating pulse.

14. A control circuit for a reperforator, which comprises a source of signals including marking and spacing conditions, a plurality of thyratrons each having a control grid and a screen grid, a plurality of conductors for connecting each of the signal conditions to the control grid of one of the thyratrons whereby a marking condition therein conditions the associated thyratron for conduction, a plurality of normally-conducting tubes, circuit means including a serially-connected capacitor for connecting the cathode of each of the normally-conducting tubes to the anode of a corresponding thyratron for supplying anode potential to the thyratron, a plurality of punch magnets associated with the reperforator, one of the punch magnets connected serially in a corresponding one of the circuit means, means for applying a potential to the screen grids of the thyratrons to fire any conditioned thyratron and thereby charge the capacitor and energize the punch magnet associated therewith, and means for reducing the anode potentials of all fired thyratrons to extinguish such thyratrons.

15. Apparatus for controlling the operation of a tape reperforator in which a plurality of punches is actuated by the selection of associated punch magnets to perforate a tape in accordance with marking conditions in a telegraph signal including marking and spacing conditions, which comprises a plurality of storage tubes each of which has two control electrodes, means for applying a potential representative of the marking condition in the signal to a first of the control electrodes of a storage tube for conditioning such tube for conduction, a plurality of normally-conducting cathode followers, circuit means for connecting the cathode of each of the cathode followers to the anode of a corresponding one of the storage means, the circuit means including a capacitor and a corresponding one of the punch magnets connected in series with a resistor connected across the capacitor to maintain the capacitor normally discharged and a diode connected across the punch magnet, means for periodically generating an operating pulse, means for rendering the operating pulses ineffective during the interval when no signal is applied to the storage tubes and for applying such an operating pulse to the second control electrodes of the storage tubes after the application of the signal conditions to the first control electrodes for rendering conductive all conditioned storage tubes, such rendering conductive of each storage tube causing an initially-large current to flow through the associated normally-discharged capacitor and the associated punch magnet for rapidly energizing the punch magnet, and means for rendering the cathode followers nonconductive to reduce the anode potentials of the storage tubes in order to render such tubes nonconductive in preparation for a subsequent signal, the diodes being so connected that they shunt the associated punch magnets upon the cathode followers being rendered nonconductive in order to extinguish the storage tubes rapidly.

References Cited in the file of this patent

UNITED STATES PATENTS

| | | |
|---|---|---|
| 2,609,444 | Slayton | Sept. 2, 1952 |
| 2,609,445 | Slayton | Sept. 2, 1952 |
| 2,669,706 | Gray | Feb. 16, 1954 |
| 2,675,078 | Zenner | Apr. 13, 1954 |
| 2,771,599 | Nolde et al. | Nov. 20, 1956 |